United States Patent [19]

Verma et al.

[11] Patent Number: 5,524,220
[45] Date of Patent: Jun. 4, 1996

[54] MEMORY SUBSYSTEMS HAVING LOOK-AHEAD INSTRUCTION PREFETCH BUFFERS AND INTELLIGENT POSTED WRITE BUFFERS FOR INCREASING THE THROUGHPUT OF DIGITAL COMPUTER SYSTEMS

[75] Inventors: Deepak Verma, Phoenix, Ariz.; W. Henry Potts, Austin, Tex.

[73] Assignee: VLSI Technology, Inc., S.J., Calif.

[21] Appl. No.: 298,988

[22] Filed: Aug. 31, 1994

[51] Int. Cl.⁶ .................................................. G06F 9/38
[52] U.S. Cl. ................ 395/375; 364/263.1; 364/243.41; 364/251
[58] Field of Search ....................... 395/375, 425

[56] References Cited

U.S. PATENT DOCUMENTS

| | | | |
|---|---|---|---|
| 4,110,822 | 8/1978 | Porter et al. | 395/375 |
| 4,760,520 | 7/1988 | Shintani et al. | 395/375 |
| 4,992,932 | 2/1991 | Ohshima | 395/375 |
| 5,146,570 | 9/1992 | Hester et al. | 395/375 |
| 5,265,213 | 11/1993 | Weiser et al. | 395/375 |
| 5,293,623 | 3/1994 | Froniewski et al. | 395/425 |

Primary Examiner—Krisna Lim
Attorney, Agent, or Firm—Harry M. Weiss & Associates

[57] ABSTRACT

A digital computer system including a memory subsystem thereof for increasing the throughput of the digital computer system is disclosed, comprising a central processing unit (CPU), a main memory, and a Look-ahead Instruction Prefetch Buffer (LIPB) external to the CPU for prefetching at least one portion of instruction code from the main memory each time the CPU initiates a request for instruction code from the main memory and for accelerating the submission of the portion of instruction code to said CPU means upon request by said CPU means without a memory system delay that is usually required when accessing a larger number of memory locations in the main memory each time the CPU initiates an instruction code request. An intelligent posted write buffer (IPWB) is also provided for temporarily storing in a first-in first-out (FIFO) configuration a portion of write-to-memory data generated by the CPU executing a write operation and for subsequently applying the portion of write-to-memory data to the main memory thereby eliminating a possible stall incurred by the CPU while waiting for the write operation to be completed.

12 Claims, 1 Drawing Sheet

MEMORY SUBSYSTEMS HAVING LOOK-AHEAD INSTRUCTION PREFETCH BUFFERS AND INTELLIGENT POSTED WRITE BUFFERS FOR INCREASING THE THROUGHPUT OF DIGITAL COMPUTER SYSTEMS

BACKGROUND OF THE INVENTION

1. Field of the Invention

This invention relates generally to digital computer systems and, more specifically, to a digital computer system having one or more buffer devices external to a central processing unit (CPU) for increasing the throughput of the digital computer system and methods therefor.

2. Description of the Related Art

Improving the performance of digital computer systems has always been a challenge for system architects. Specifically, much design work has focused on decreasing the time, or number of clock cycles, a given CPU must spend communicating with the relatively large main memory, or RAM, of a digital computer when executing read-from-memory and write-to-memory operations.

Most modern microprocessors, such as Intel's 486 CPU, include a small (8k bytes for the 486) internal first level cache memory (L1) to increase system performance. Cache memories are fast memory storage devices that utilize the principle of locality of reference to improve CPU read-from-memory efficiency and, therefore, overall system performance. Whenever the CPU accesses the main memory for code or data, additional bytes "surrounding" the byte(s) being fetched are brought into the cache in the form of a cache line. The principle of locality of reference predicts that the CPU will very probably use the additional bytes subsequent to the use of the code or data brought in, and quite possibly a multiple number of times. Multiple uses of the same code or data occurs during program loops, for example. These subsequent accesses will be "hits" in the relatively small and fast cache, and will therefore speed up execution because each "hit" reduces by one the number of CPU accesses to the relatively large and slow main memory. In the event of a "miss" in the cache, the CPU must access the main memory for its required code or data and the cache is loaded with a new cache line of memory that "surrounds" this required code or data for potential subsequent use by the CPU.

To further decrease memory latency and increase system performance, some higher performance PC systems, whether desk-top or notebook, include a large (e.g. 128K bytes) second level cache (L2) in their memory subsystems. An L2 cache performs the same basic task as an L1 cache but is much larger and external to the CPU. Therefore, an L2 cache can not only decrease memory latency, but also helps to reduce memory bus utilization, allowing Direct Memory Access (DMA) devices more access to the system memory, thereby further increasing system throughput.

L2 cache subsystems, however, can be quite expensive, large and power hungry. Typical L2 caches hold 128K bytes of memory or more and can cost hundreds of dollars. As today's personal computers continue to decrease in size with the proliferation of portable, battery-powered notebook, sub-notebook and hand-held computers, and as prices plummet, L2 cache subsystems have become cost prohibitive in terms of price, real estate and power consumption for many of these smaller systems.

Accordingly, a definite need has evolved to provide alternatives to L2 cache memory subsystems that would be small and low cost, that would consume little power, that would be external to the CPU and that would significantly increase CPU read/write from-memory efficiency and, consequently, the throughput of personal computer systems.

Another well known approach to improve CPU performance is the Posted Write Buffer (PWB). In a basic computer system without a PWB, when the CPU generates a data write-to-memory operation, it must wait for the write cycle to complete before starting a subsequent cycle on the bus. If the cycle following the write happens to be a data read cycle, the CPU will be forced to wait till the write cycle finishes, and the read cycle goes through returning data to the CPU. The CPU can get stalled for significant amounts of time if the read follows multiple write cycles. The PWB is designed to decrease the latency of write-to-memory cycles generated by the CPU by providing a buffer into which the CPU may quickly "dump" data for temporary storage in a first-in first-out (FIFO) configuration for subsequent submission to the main memory whenever the memory is available. The CPU, therefore, sees a very fast response to sequential write operations going to the main memory. If a subsequent read is now allowed to go to the memory while the writes, in the PWB wait, the stall time of the CPU is significantly reduced. This can be done by incorporating enough "intelligence" in the PWB to ensure that the CPU gets the latest data when the read completes (Read Around Write with Merge). The efficiency of the system can be further improved by combining (in the PWB) multiple writes going to the same Dword in main memory (combine and store). Multiple CPU writes can thereby result in a single write to main memory when the PWB writes out the "combined" data.

While the Intelligent Posted Write Buffer (IPWB) increases CPU efficiency through its fast response to CPU writes, and its ability to move memory writes out of the way of subsequent reads, there exists a need for speeding up response to CPU reads so that these can move out of the way of subsequent reads and writes so that the CPU is not stalled.

SUMMARY OF THE INVENTION

In accordance with one embodiment of this invention, it is an object of this invention to provide a digital computer system including a memory subsystem thereof for increasing the throughput of the digital computer system.

It is another object of this invention to provide a Look-ahead Instruction Prefetch Buffer (LIPB) external to the CPU for accelerating the throughput of the digital computer system by prefetching at least one portion of instruction code from the main memory and for submitting the portion of instruction code to the CPU upon request.

It is a further object of this invention to provide an Intelligent Posted Write Buffer (IPWB) external to the CPU for accelerating the throughput of the digital computer system by storing a portion of data generated by the CPU in a write operation for eventual submission to the main memory, while also providing Read-Around-Write and Combine-And-Store functions, in combination with the Look-ahead Instruction Prefetch Buffer.

It is yet another object of this invention to provide a method of operating a digital computer system including a memory subsystem thereof for increasing the throughput of the digital computer system.

BRIEF DESCRIPTION OF THE PREFERRED EMBODIMENTS

In accordance with one embodiment of this invention, a digital computer system including a memory subsystem thereof for increasing the throughput of the digital computer system is disclosed, comprising, in combination, Central Processing Unit (CPU) means for providing processing for the digital computer system, main memory means coupled to the CPU means for providing storage of information, and Look-ahead Instruction Prefetch Buffer (LIPB) means external to the CPU means and coupled to both the CPU means and main memory means for prefetching at least one portion of instruction code from the main memory means each time the CPU means initiates a request for instruction code from the memory means, and for accelerating the submission of the portion of instruction code to the CPU means upon request by the CPU means without a memory system delay that is usually required when accessing a larger number of memory locations in the main memory means each time the CPU means initiates an instruction code request. The LIPB means comprises LIPB memory means coupled to the CPU means for temporarily storing the portion of instruction code, and LIPB control logic means coupled to the main memory means for determining the location of and for fetching the portion of instruction code from the main memory means to be stored in the LIPB memory means before the CPU means requests a subsequent line of instruction code. The LIPB memory means is comprised of at least one cache line of memory capacity. The portion of instruction code to be prefetched is assumed to be located in the main memory means sequentially after a first portion of instruction code requested by the CPU means.

In accordance with another embodiment of this invention a digital computer system including a memory subsystem thereof for increasing the throughput of the digital computer system is disclosed comprising, in combination, CPU means for providing processing for the digital computer system, main memory means coupled to the CPU means for providing storage of information, LIPB means external to and coupled to the CPU means for prefetching at least one portion of instruction code from the main memory means each time the CPU means initiates a request for instruction code from the memory means and for accelerating the submission of the portion of instruction code to the CPU means upon request by the CPU means without a memory system delay that is usually required when accessing a larger number of memory locations in the main memory means each time the CPU means initiates an instruction code request, and Intelligent Posted Write Buffer (IPWB) means external to and coupled to the CPU means for temporarily storing in a first-in first-out (FIFO) configuration a portion of write-to-memory data generated by the CPU means executing a write operation and for subsequently applying the portion of write-to-memory data to the main memory means thereby eliminating a possible stall incurred by the CPU means while waiting for the write operation to be completed.

In accordance with yet another embodiment of this invention, a method of operating a digital computer system including a memory subsystem thereof for increasing the throughput of the digital computer system is provided comprising the steps of providing CPU means for providing processing for the digital computer system, providing main memory means coupled to the CPU means for providing storage of information and providing LIPB means external to the CPU means and coupled to both the CPU means and main memory means for prefetching at least one portion of instruction code from the main memory means each time the CPU means initiates a request for instruction code from the memory means and for accelerating the submission of the portion of instruction code to the CPU means upon request by the CPU means without a memory system delay that is usually required when accessing a larger number of memory locations in the main memory means each time the CPU means initiates an instruction code request.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
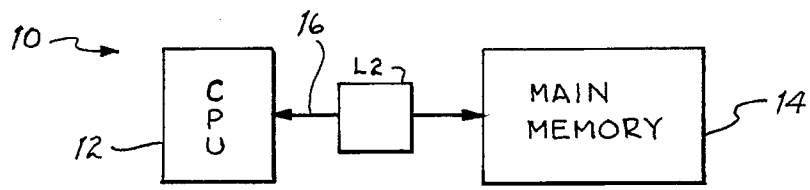
FIG. 1 is a simplified block diagram of a portion of a prior art digital computer system.

Referring to FIG. 1, a simplified block diagram of a portion of a basic digital computer system 10, representing the prior art, is provided. Central processing unit (CPU) 12 is coupled to main memory 14 through CPU bus 16. When CPU 12 requires instruction code or data from main memory 14, it sends a fetch (or read) signal to main memory 14 on CPU bus 16. CPU 12 must wait for receipt of all data, and code in certain situations (e.g. branches, prefetch would not stall the CPU), before continuing internal execution. Similarly, CPU 12 may send (or write) data to main memory 14 on CPU bus 16. CPU 12 may or may not include an internal (L1) cache memory or internal prefetch for improving its performance.

Figure 2:
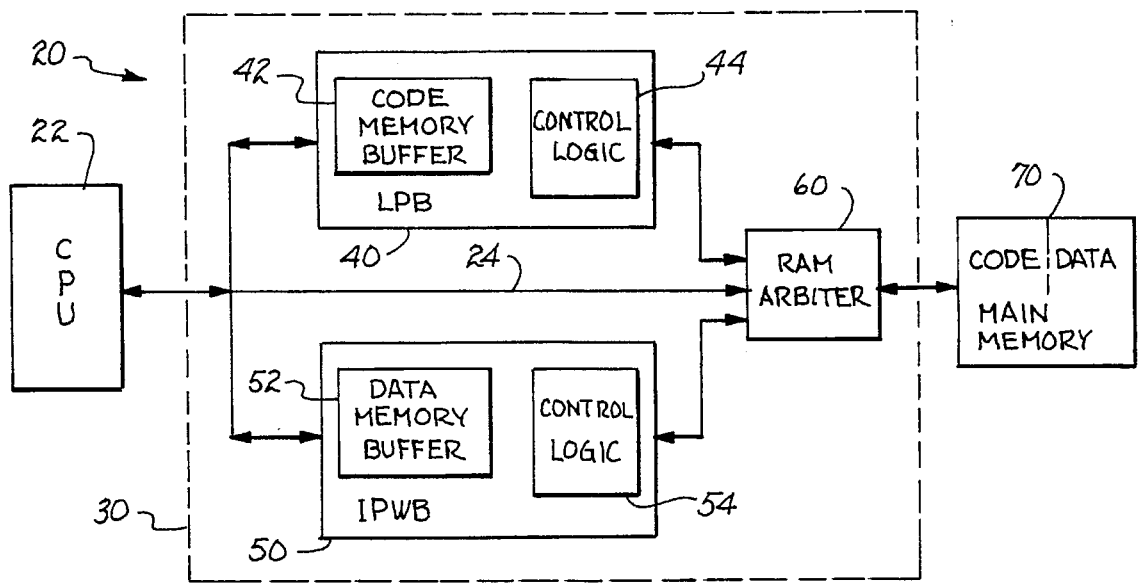
FIG. 2 is a simplified block diagram of a portion of a new digital computer system including a memory subsystem.

Referring to FIG. 2, a portion of a new and improved digital computer system 20 is disclosed. Computer system 20 is comprised of CPU 22 coupled to buffer subsystem 30 (through CPU bus 24) which, in turn, is coupled to main memory 70. Buffer subsystem 30 is comprised of Look-ahead Instruction Prefetch Buffer (LIPB) 40 coupled to CPU 22, Intelligent Posted Write Buffer (IPWB) 50 coupled to CPU 22, and RAM arbiter 60 coupled to LIPB 40, IPWB 50, CPU 22 through CPU bus 24, and main memory 70. LIPB 40 is comprised of instruction code memory buffer 42 and control logic 44. In the preferred embodiment, instruction code memory buffer 42 is comprised of a capacity for one cache line (sixteen bytes of code for 486). IPWB 50 is comprised of data memory buffer 52 and control logic 54, which is further detailed below.

Figure 3:
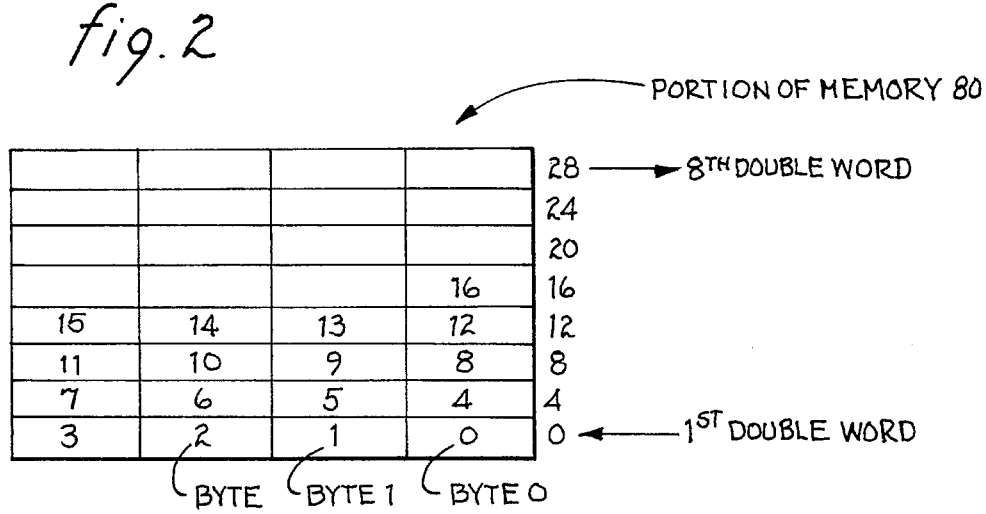
FIG. 3 is a chart depicting a portion of memory.

Referring to FIG. 3, a portion of memory 80 representing data memory buffer 52 of IPWB 50 is shown. In the preferred embodiment, data memory buffer 52 contains eight double words (or eight D-words, equivalent to 32 bytes) of memory capacity. The first D-word is comprised of bytes 0, 1, 2 and 3. The second D-word is comprised of bytes 4, 5, 6 and 7, and so on.

OPERATION

A) Look-Ahead Instruction Prefetch Buffer

The Look-ahead Instruction Prefetch Buffer 40 shown in FIG. 2 uses a subset of the principle of locality of reference, used with cache memories, namely that the program instruction code being executed resides in sequential locations in main memory 70. When CPU 22 accesses main memory 70 for instruction code, it is very likely that it would access subsequent bytes in its next code access. LIPB 40, therefore, prefetches a sequential portion of instruction code from main memory 70 every time CPU 22 makes a request for instruction code after the requested instruction code has been transferred to the CPU. Utilizing an external LIPB 40 even benefits a CPU that includes internal prefetching. The reason is that LIPB 40 helps reduce CPU bus 24 utilization for code prefetch, thereby reducing the stalls that might occur because of data reads and writes while the prefetch is going on.

B) Intelligent Posted Write Buffer

As described above, the posted write buffer of the prior art provides a temporary storage location into which the CPU can rapidly "dump" data headed for RAM. As far as the CPU is concerned, the write operation has been received by the main memory and, therefore, it can run more bus cycles. Essentially, the PWB reduces the impact of the write cycles issued by the CPU by responding quickly and temporarily storing these in a FIFO for eventual sending to the main memory. IPWB 50 provides these functions in addition to the Read-Around-Write and Combine-And-Store features.

i) Read-Around-Write

In a computer system with a standard posted write buffer, the following situation may arise: The CPU generates a data write-to-memory operation which is temporarily stored in the PWB. However, before the PWB deposits the data into the main memory, the CPU generates a read-from-memory request for the very same data or for a portion of data that contains this data. In order for the CPU to re-access this data, the PWB must first flush its buffer out to the main memory so that the CPU can then fetch the required data from the main memory. IPWB 50 enables CPU 22 to read around the write operation. That is, CPU 22 does not wait for IPWB 50 to flush its data memory buffer 52 into main memory 70 in order to retrieve the required data from main memory 70. Instead, CPU 22 sends its read signal on CPU bus 24 and both IPWB 50 and main memory 70 receive the signal simultaneously. If all the data required by CPU 22 is still located in IPWB 50, it is directly sent to CPU 22. If a portion of the data required is located in IPWB 50, it appends this valid portion of data to the matching portion sent by main memory 70. Eliminating the need to flush the buffer to main memory 70 to enable CPU 22 to access the required data further improves the efficiency of the system.

ii) Combine-and-Store

A typical 32-bit, 486-based computer, organizes data in memory in a D-word structure, such as that shown in FIG. 3. When sending a write-to-memory cycle on its bus, however, the CPU may generate its data in varying lengths and with addresses not necessary aligned to the Least Significant byte of a D-word. A single write operation may contain a D-word of data or less, such as one word, or one byte. Often, the data write crosses a D-word boundary. For example, referring to FIG. 3, one CPU write operation may comprise of bytes 2, 3, 4 and 5. Half of its data (bytes 2 and 3) reside in the first d-word memory location and the second half (bytes 4 and 5) reside in the second d-word memory location. This boundary crossing of two double word locations is called misalignment. The CPU would need to send out two write bus cycles to complete this write operation. The next write operation from the CPU is also misaligned and is comprised of bytes 6, 7, 8 and 9 which would, again, take two bus cycles to complete. The combine-and-store feature of IPWB 50 stores in a FIFO all of this data, recognizes this sequential misalignment and "combines" bytes 4 and 5 from the first write operation with bytes 6 and 7 from the second write operation resulting in realignment of the second double word for an efficient single write cycle to main memory 70.

C) RAM Arbiter

As shown in FIG. 2, RAM Arbiter 60 "sees" requests from CPU 22, LIPB 40 and IPWB 50 to main memory 70. Arbiter 60 prioritizes the requests from these three sources to decide who gets the next memory cycle. Data reads from CPU 22 are given the highest priority. LIPB 40 code prefetches are next, followed by IPWB 50 data write-to-memory operations.

The inclusion of an external LIPB 40 to a digital computer system 20 has been shown to increase system performance. Likewise, the use of IPWB 50 also improves system throughput. However, the combination of both buffers 40 and 50 acting in concert provides a performance boost beyond the additive effects of each buffers' independent contribution. Therefore, given the small investment, compared to the inclusion of an L2 cache memory, the LPB 40/IPWB 50 combination is an excellent alternative for CPU 22 performance enhancement in small systems.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A digital computer system including a memory subsystem thereof for increasing the throughput of the digital computer system comprising, in combination:

central processing unit (CPU) means for providing processing for said digital computer system;

main memory means coupled to said CPU means for providing storage of information;

look-ahead Instruction Prefetch Buffer (LIPB) means external to said CPU means and coupled to both said CPU means and said main memory means for prefetching a sequential portion of requested instruction code from said main memory means each time said CPU means initiates a request for said requested instruction code from said main memory means after said requested instruction code has been transferred to said CPU means and for accelerating the submission of said sequential portion of said requested instruction code to said CPU means upon request by said CPU means of said sequential portion of said requested instruction code without a memory system delay by transferring said sequential portion of said requested instruction code from said LIPB means to said CPU means for execution without having to access said main memory means which is slower and larger than said LIPB means; and intelligent posted write buffer (IPWB) means external to and coupled to said CPU means for temporarily storing a portion of write-to-memory data generated by said CPU means executing a write operation and for enabling said CPU means to read around a write-to-memory operation by having said CPU means send a signal to said IPWB means to transfer any of said portion of write-to-memory data located in said IPWB means required by said CPU means directly to said CPU means without having to first transfer said any of said portion of write-to-memory data required by said CPU means from said IPWB means to said main memory means.

2. The system of claim 1 wherein said IPWB means comprises:

(a) IPWB memory means coupled to said CPU means for temporarily storing in a first-in first-out (FIFO) configuration said portion of write-to-memory data from said CPU means; and (b) IPWB control logic means coupled to both said CPU means and said main memory means for transferring any of said portion of write-to-memory data located in said IPWB memory means required by said CPU means directly to said CPU means without having to first transfer said any of said portion of write-to-memory data required by said CPU means from said IPWB means to said main memory means.

3. The system of claim 2 wherein said IPWB memory means comprises at least from one to eight double words of memory capacity.

4. The system of claim 2 wherein said IPWB control logic means comprises read-around-write means coupled to said CPU means for enabling said CPU means to initiate a read operation from both said main memory means and said IPWB means after generating said write operation on the CPU bus but before said IPWB means completes said write operation to said main memory means.

5. The system of claim 2 wherein said IPWB control logic means further comprises Combine-And-Store means coupled to said CPU means for providing the conversion of at least two data write operations from said CPU means that are targeted at the same location in said main memory means into a single data write operation to said main memory means.

6. The system of claim 1 wherein said LIPB means comprises:

(a) LIPB memory means coupled to said CPU means for temporarily storing said portion of instruction code; and (b) LIPB control logic means coupled to said main memory means for determining the location of and for beginning the fetch of said portion of instruction code from said main memory means to be stored in said LIPB memory means before said CPU means requests a subsequent line of instruction code.

7. The system of claim 6 wherein said LIPB memory means is comprised of at least one cache line of memory capacity.

8. A digital computer system including a memory subsystem thereof for increasing the throughput of the digital computer system comprising, in combination:

central processing unit (CPU) means for providing processing for said digital computer system;

main memory means coupled to said CPU means for providing storage of information; and intelligent posted write buffer (IPWB) means external to and coupled to said CPU means for temporarily storing in a first-in first-out (FIFO) configuration a portion of write-to-memory data generated by said CPU means executing a write operation and for enabling said CPU means to read around a write-to-memory operation by having said CPU means send a signal to said IPWB means to transfer any of said portion of write-to-memory data located in said IPWB means required by said CPU means directly to said CPU means without having to first transfer said any of said portion of write-to-memory data required by said CPU means to said main memory means.

9. The system of claim 8 wherein said IPWB means comprises:

(a) IPWB memory means coupled to said CPU means for storing said portion of write-to-memory data from said CPU means; and (b) IPWB control logic means coupled to both said CPU means and said main memory means for transferring any of said portion of write-to-memory data located in said IPWB memory means required by said CPU means directly to said CPU means without having to first transfer said any of said portion of write-to-memory data required by said CPU means to said main memory means.

10. The system of claim 9 wherein said IPWB memory means comprises at least from one to eight double words of memory capacity.

11. The system of claim 9 wherein said IPWB control logic means comprises read-around-write means coupled to said CPU means for enabling said CPU means to initiate a read operation from both said main memory means and said IPWB means after generating said write operation on a CPU bus but before said IPWB means completes said write operation to said main memory means.

12. The system of claim 9 wherein said IPWB control logic means further comprises Combine-And-Store means coupled to said CPU means for providing the conversion of at least two data write operations from said CPU means that are targeted at a same location in said main memory means into a single data write operation to said main memory means.

* * * * *